(12) United States Patent
Kitajima et al.

(10) Patent No.: US 7,856,412 B2
(45) Date of Patent: Dec. 21, 2010

(54) RELIABILITY EVALUATION PROGRAM AND RELIABILITY EVALUATION DEVICE

(75) Inventors: Hironobu Kitajima, Kawasaki (JP); Ryo Ochitani, Kawasaki (JP); Morio Ikesaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 11/976,463

(22) Filed: Oct. 24, 2007

(65) Prior Publication Data
US 2008/0168021 A1 Jul. 10, 2008

(30) Foreign Application Priority Data
Jan. 5, 2007 (JP) ............... 2007-000784

(51) Int. Cl.
G06F 9/44 (2006.01)
G06N 7/02 (2006.01)
G06N 7/06 (2006.01)

(52) U.S. Cl. ...................................................... 706/52
(58) Field of Classification Search .................... 706/52
See application file for complete search history.

(56) References Cited

U.S. PATENT DOCUMENTS

| | | | |
|---|---|---|---|
| 6,875,105 B1 * | 4/2005 | Behm et al. ................... | 463/17 |
| 7,313,635 B1 * | 12/2007 | Zavalkovsky ............... | 709/248 |
| 7,447,970 B2 * | 11/2008 | Wu et al. ..................... | 714/751 |
| 7,630,910 B2 * | 12/2009 | Bonissone et al. ............ | 705/4 |

FOREIGN PATENT DOCUMENTS

| | | |
|---|---|---|
| JP | 06-338900 | 12/1994 |
| JP | 3588042 | 8/2004 |
| JP | 2005-045535 | 2/2005 |

OTHER PUBLICATIONS

Speech activated telephony email reader (SATER) based on speaker verification and text-to-speech conversion, Chung-Hsien Wu; Jau-Hung Chen; Consumer Electronics, IEEE Transactions on vol. 43 , Issue: 3 Digital Object Identifier: 10.1109/30.628698 Publication Year: 1997 , pp. 707-716.*

(Continued)

Primary Examiner—Michael Holmes
(74) Attorney, Agent, or Firm—Staas & Halsey LLP

(57) ABSTRACT

A computer-readable recording medium storing a program to make a computer execute a process, the process including generating normal/abnormal patterns of paths between a start point node of application procedure and a reliability verification point node based on a node information that stores an object related to a fact confirmation at application procedure as a node and a path information that stores processing executed between nodes as path; determining whether it is possible to reach the verification point node from the start point node only via normal paths regarding each normal/abnormal pattern; generating a calculation expression to find the reliability of the application procedure as the total generation probability of the normal/abnormal patterns which was determined as reachable; and calculating the reliability of the application procedure by applying the probability of normality of the paths stored corresponding to each path in the path information.

14 Claims, 12 Drawing Sheets

OTHER PUBLICATIONS

Japanese Notification of Reasons for Refusal issued on Jan. 8, 2009, for corresponding Japanese Patent Application No. 2007-000784.
Kubo Mikio, Tamura Akihisa, Matsui Tomomi, "Ouyou suuri keikaku handbook", AsakuraSyoten, Apr. 30, 2002. Translation of relevant portion is from the $3^{rd}$ to $4^{th}$ line from the bottom of pp. 889.

Fujiwara Kazuhiro, Katoh Shinichi, Watanabe Hitoshi, "IP mou no shinraisei hyoukahouhou no kentou (Study of reliability evaluation method in IP networks)", IEICE Technical Report, vol. 104, No. 77, pp. 7-12, May 19, 2004. Translation or relevant portion is for Section 5.1 and 5.2, Table 1, Fig. 7, 8, and 9 in pp. 11.

* cited by examiner

*Fig. 5*

| Node ID | Node name | Start point flag | Verification point flag |
|---|---|---|---|
| ND001 | Structural design information @ structural designer | 1 | 0 |
| ND002 | Structure calculation input information @ structural designer | 0 | 0 |
| ND003 | Structure calculation output information @ structural designer | 0 | 0 |
| ND004 | Structural design information @ checker | 0 | 0 |
| ND005 | Structure calculation input information @ checker | 0 | 0 |
| ND006 | Structure calculation output information @ checker | 0 | 1 |

Fig. 6

| Path ID | Node A | Node B | Action name | Direction | Normality probability |
|---|---|---|---|---|---|
| P001 | ND001 | ND002 | Input information creation @structural designer | 1 | 0.98 |
| P002 | ND001 | ND004 | Reproduction (submission) @structural designer | 3 | 0.99 |
| P003 | ND002 | ND003 | Structure calculation @structural designer | 1 | 1.00 |
| P004 | ND002 | ND005 | Reproduction (submission) @structural designer | 3 | 0.99 |
| P005 | ND003 | ND006 | Reproduction (submission) @structural designer | 3 | 0.99 |
| P006 | ND004 | ND005 | Input information creation confirmation @checker | 1 | 1.00 |
| P007 | ND005 | ND006 | structure calculation confirmation @checker | 1 | 1.00 |

RELIABILITY EVALUATION PROGRAM AND RELIABILITY EVALUATION DEVICE

CROSS-REFERENCE TO RELATED APPLICATIONS

This application is based upon and claims the benefit of priority from the prior Japanese Patent Application No. 2007-784 filed on Jan. 5, 2007, the entire contents of which are incorporated herein by reference.

BACKGROUND OF THE INVENTION

Field of the Invention

The invention pertains to an application procedure for exchanging documents between an applicant and a person to whom an application is submitted. A benefit is granted to the person who applies at the discretion of the person to whom the application was submitted. The determination whether to grant the benefit is based on the intention of the person who applies and the fact relevance. This may be the case, for example, in an administrative procedure for individuals and a licensing procedure performed by government and municipal offices. Of course, the application procedure to which the present invention can be applied to is not limited to the above-mentioned one.

The procedure for exchanging documents can also apply to an application procedure performed in business enterprises. In this application procedure, a certificate might be used to confirm the contents described in the application. In recent years, an advanced counterfeit prevention technology such as an electronic signature described in Japanese Patent No. 3588042 has been applied to the certificate to improve the reliability of the certificate.

However, if the application procedure is complicated, it is difficult to secure the reliability of the application procedure, even if an advanced counterfeit prevention technology is applied to the certificate. The application procedure may be vulnerable to practices such as "Spoofing," in which an applicant disguises himself/herself as somebody else. It is also easy to make mistakes in a complicated application procedure.

In order to improve the reliability of the application procedure, technology to evaluate the reliability of the application procedure quantitatively and support finding the problems and planning corrective measures is useful.

SUMMARY OF THE INVENTION

According to an aspect of an embodiment, a computer-readable recording medium stores a program to make a computer execute a process, the process including generating normal/abnormal patterns of paths between a start point node of an application procedure and a reliability verification point node based on a node information that stores an object related to a fact confirmation at the application procedure as a node and a path information that stores processing executed between nodes as path; determining whether it is possible to reach the verification point node from the start point node only via normal paths regarding each normal/abnormal pattern; generating a calculation expression to find the reliability of the application procedure as the total generation probability of the normal/abnormal patterns which determined as reachable; and calculating the reliability of the application procedure by applying the probability of normality of the paths stored corresponding to each path in the path information.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 exemplifies the data structure of node information;

FIG. 6 exemplifies the data structure of path information;

DETAILED DESCRIPTION OF THE PREFERRED EMBODIMENTS

Preferred embodiments of the reliability evaluation program and the reliability evaluation device of this embodiment are explained in detail by referring to the following attached drawings.

Embodiment 1

First of all, the outline of the reliability evaluation method of this embodiment is explained with a procedure for an application for building certification as an example. In the building certification procedure, the applicant submits an application that shows the designed architectural structure has enough strength to a public office, and obtains building permission to build the architectural structure from the public office.

Figure 1:
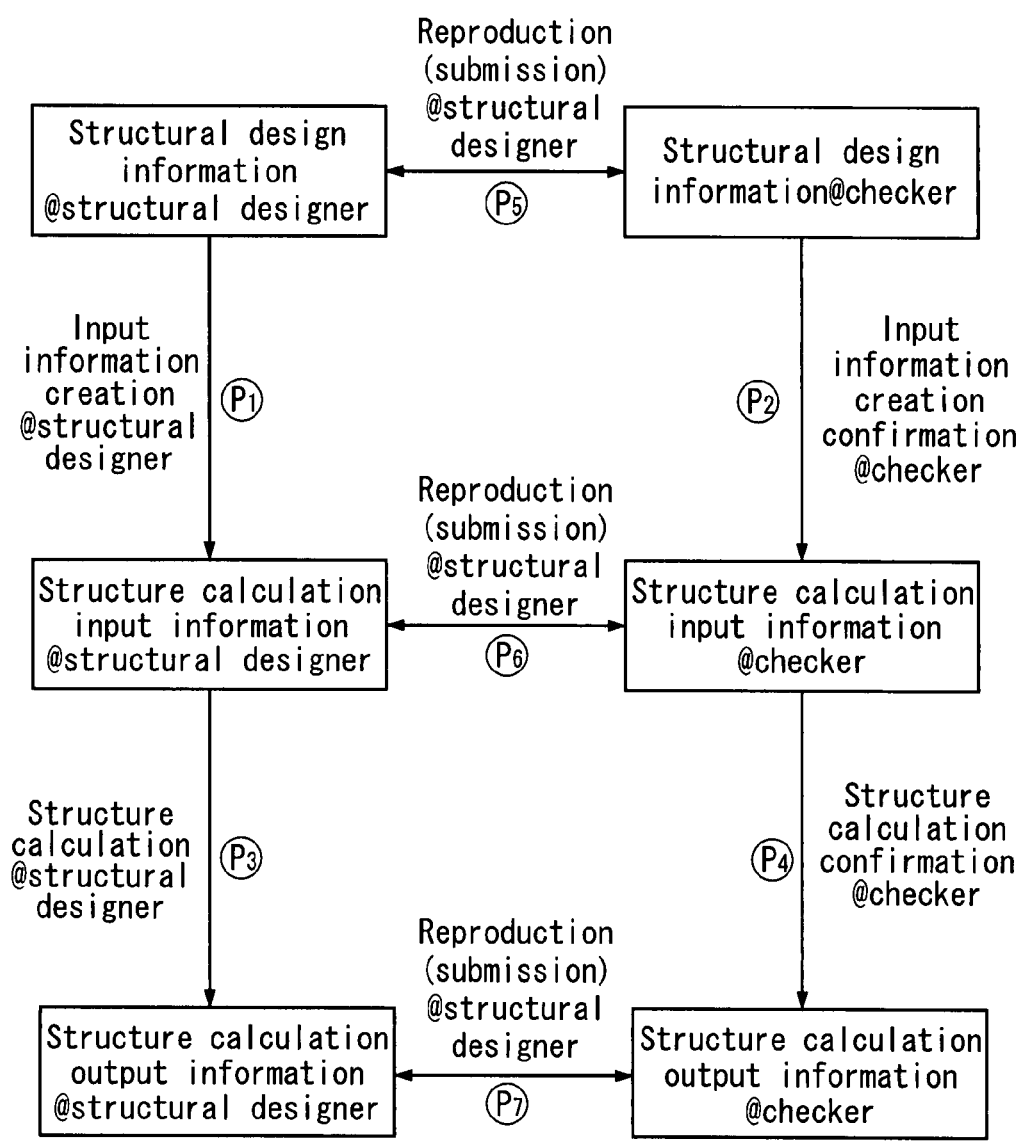
FIG. 1 exemplifies an action diagram that models the application for building a certification procedure.

FIG. 1 is an example of an action diagram that models the application for building certification procedure. As shown in the figure, the action diagram is configured by connecting the rectangle corresponding to the object with the arrow corresponding to the action.

An object such as a document is used for the fact confirmation in each step of the procedure. In the reliability evaluation method of this embodiment, even if the same document is used in a different process, it is regarded as a different object.

To distinguish the object per process, the object is described with the form of <Object name>@<Owner of the object in the process>. For example, even if "Structural design information @ structural designer" and "Structural design information @ checker" are physically the same structural design information, they are treated as different objects in the reliability evaluation method of this embodiment.

An action such as processing is executed in relation to the object. The action has directionality according to the direction of transmission or conversion of information. The direction of the arrow in the action diagram means the directionality. The action is described with the form of <action name>@<subject of the action>.

Here, the application for building certification procedure shown in FIG. 1 is explained. The application for building certification procedure shown in this figure comprises objects that are "Structural design information @ structural designer", "Structure calculation input information @ structural designer", "Structure calculation output information @ structural designer", "Structural design information @ checker", "Structure calculation input information @ checker," and "Structure calculation output information @ checker." The structural designer corresponds to the applicant who performs the application procedure, and the checker corresponds to the public office that determines the contents of the application.

"Structural design information @ structural designer" is information that is created as a result of the structural designer's performing the structural design of the architectural structure. "Structural design information @ structural designer" becomes "Structure calculation input information @ structural designer" by the action "Input information creation @ structural designer." "Input information creation @ structural designer" is an action that creates the input information for the structural designer to perform the structure calculation of the architectural structure on the basis of "Structural design information @ structural designer." "Structure calculation input information @ structural designer" is input information created by this action.

"Structure calculation input information @ structural designer" becomes "Structure calculation output information @ structural designer" by the action "Structure calculation @ structural designer." "Structure calculation @ structural designer" is an action in which the structural designer executes the structure calculation of an architectural structure based on "Structure calculation input information @ structural designer" and "Structure calculation output information @ structural designer" is output information created by this action.

In addition, "Structural design information @ structural designer," "Structure calculation input information @ structural designer" and "Structure calculation output information @ structural designer" become "Structural design information @ checker," "Structure calculation input information @ checker" and "Structure calculation output information @ checker" respectively by the action "Reproduction (submission) @ structural designer."

"Reproduction (submission) @ structural designer" is an action in which the structural designer reproduces the object and submits it to the application destination. "Structural design information @ checker," "Structure calculation input information @ checker" and "Structure calculation output information @ checker" are information checked by the checker. In this example, "Reproduction (submission) @ structural designer" is an interactive action because the contents of the objects before and after application are the same.

In addition, "Structural design information @ checker" is comparison checked with "Structure calculation input information@ checker" by the action "Input information creation confirmation @ checker." "Structure calculation input information @ checker" is comparison checked with "Structure calculation output information @ checker" by the action "Structure calculation confirmation @ checker." "Input information creation confirmation @ checker" and "Structure calculation confirmation @ checker" are actions by which the checker creates information or performs structure calculation by using a part of or all of the information of the check object, and confirms that the check object is correct.

In addition, probability p1 to p7 is set to each action in the action diagram shown in FIG. 1. Probability p1 to p7 shows the probability that the corresponding action will be correctly executed.

The reliability evaluation method of this embodiment regards the entire application procedure that was described as the action diagram as the network, the object as the node, and the action as the path between the nodes. Moreover, the reliability of the application procedure is evaluated by using the calculation technique of the network reliability.

Network reliability is the connectivity of entire network. Reliability is the reachability from a node to a node. The reliability is described by a probability that the path that connects the nodes will cause a malfunction stochastically if it is cut. Concretely, the probability in which each path normally functions is given as $p_e$. The probability of each path is assumed to be mutually independent. The reliability Rel (G) of network G is calculated by the following Expression 1.

[Expression 1]

$$Rel(G) = \sum_{S \subseteq E} \psi(S) \prod_{e \in S} p_e \prod_{e \notin S} (1 - p_e) \tag{1}$$

Here, E shows a set of paths in a network G. S shows a set of paths that function normally in the network G. Moreover, $p_e$ shows the probability that a path e functions normally. Finally, $\psi(S)$ is a function that becomes 0 when S is normal, and becomes 1 in the other cases.

"S is normal" means that a set of normal paths S meets the reliability condition $\psi$ as a network. Though the condition may vary depending on concrete application, it generally means, "From a start point node s, it is possible to trace only normal paths in the permitted direction and reach a verification point node t (s and t can be plural nodes)."

The condition $\psi$ in FIG. 1 determines the reachability when "Structural design information @ checker" is assumed to be the start point and "Structure calculation output information @ checker" is the end point. The reliability of the network in FIG. 1, that is, the reliability of the application procedure can be found by the following Expression 2.

[Expression 2]

$$Rel(G) = \{1 - (1 - p_1)(1 - p_2)\}p_5 p_6\{1 - (1 - p_4)(1 - p_3 p_7)\} + \\ p_5(1 - p_6)\{1 - (1 - p_2 p_4)(1 - p_1 p_3 p_7)\} + \\ p_2(1 - p_5)\{1 - (1 - p_4)(1 - p_3 p_6 p_7)\} \tag{2}$$

In an actual application for building certification procedure, the path of "Structure calculation @ structural designer" is executed with specified software to prevent a structural designer from intervening in the process of the structure calculation artificially. Then, if it is assumed that $p_3 = 1$, the above-mentioned Expression 2 can be shown to be the Expression 3 below.

Expression 3

$$Rel(G) = p_1 p_5 \{p_7 + p_4(p_6 - p_6 p_7)\} + p_2[(1 - p_1 p_5)p_6 p_7 + \\ p_4\{1 - p_6 p_7 + p_1 p_5(-p_6 - p_7 + 2 p_6 p_7)\}] \tag{3}$$

Here, if the falsification prevention measure is not adopted for the path of "Reproduction (submission) @ structural designer" and it could be cheated easily, that is, if it is $p_5=p_6=p_7=0$, reliability becomes as follows:

Expression 4

$$Rel(G)=p_2p_4 \qquad (4)$$

Even if it improves the probability of normality of the paths of "Structure calculation @ structural designer," this shows that the reliability dependence on the checker side action is not reduced at all.

As a measure to improve the probability of normality of the paths of "Reproduction (submission) @ structural designer," for example, an electronic signature may be required on reproductions. With this measure, the probability can be close to $p_5=p_6=p_7=1$ If the path of "Input information creation @ structural designer" is cheated, however, $(p_1=0)$, reliability becomes like the following Expression 5. As a result, it turns out that the reliability dependence on the action of "Input information creation confirmation @ checker" is not reduced at all.

Expression 5

$$Rel(G)=p_2 \qquad (5)$$

Thus, by evaluating the reliability of the application procedure by using the calculation method of the network reliability, it is easy to figure out on which action the reliability of the entire application procedure mainly depends.

Figure 2:
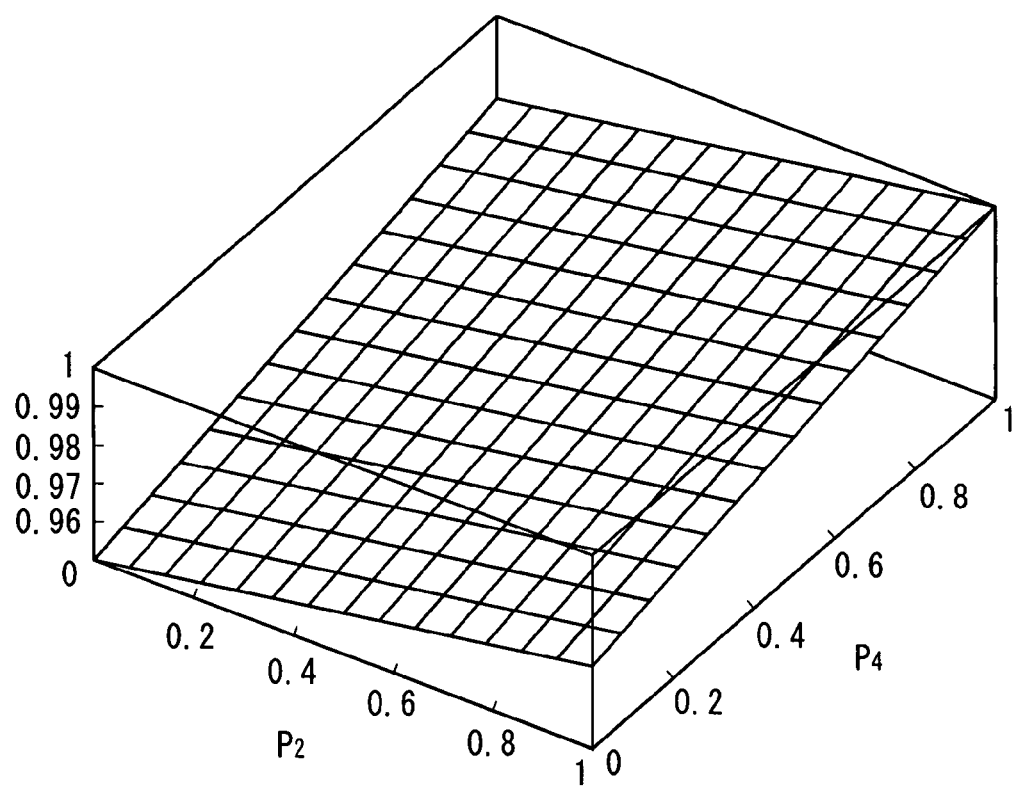
FIG. 2 exemplifies a graph in which Expression 6 is shown.

In addition, by evaluating the reliability of the application procedure by using the calculation method of the network reliability, the discussion of process improvement can also be supported. For instance, if it is assumed that a survey to detect cheating on applications for building certification was performed, and cheating was detected in 1% of all the actions performed by the structural designer. a In that case, $p_1=p_3=p_5=p_6=p_7=0.99$, and the above Expression 2 is described as the Expression 6 below. A graph of Expression 6 is shown in FIG. 2.

Expression 6

$$Rel(G)=0.96059601+p_2(0.0193089501+ \\ 0.0007860898p_4)+0.0193089501p_4 \qquad (6)$$

Figure 3:
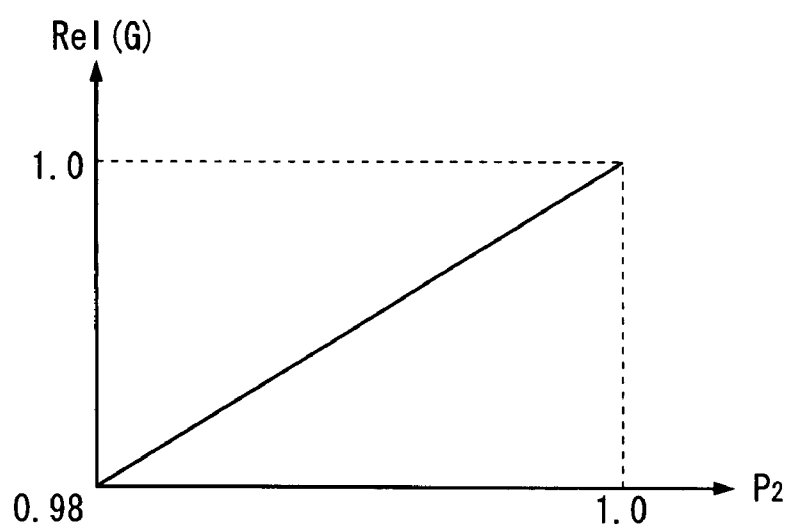
FIG. 3 exemplifies a graph in which Expression 7 is shown.

Moreover, if it is assumed that the action of "Structure calculation @ structural designer" is executed with specified software, and a reliability improvement measure such as an electronic signature is applied to the action of "Reproduction (submission) @ structural designer", then $p_3=p_6=p_7=1$ and $p_1=p_5=0.99$, and the above Expression 2 is described like the Expression 7 below. A graph of Expression 7 is shown in FIG. 3.

Expression 7

$$Rel(G)=0.9801+0.0199p_2 \qquad (7)$$

Thus, by giving a predicted value and the actual measurement value of the probability of normality of a part of paths to the expressions of reliability, it is possible to figure out how the change of probability of normality of the other paths affects the reliability of entire application procedure. Consequently, it becomes possible to perform appropriate discussion about the target parts of process improvement and the target values by using the reliability evaluation method of this embodiment.

Figure 4:
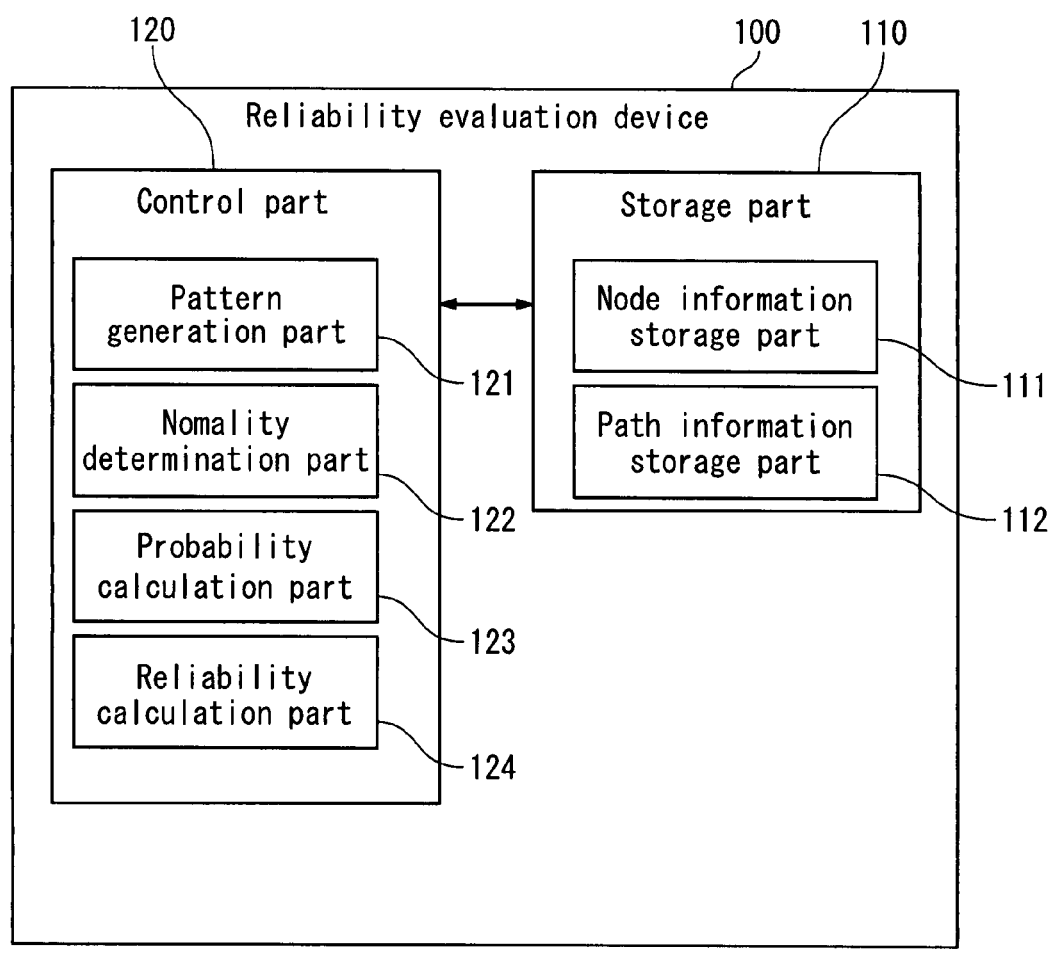
FIG. 4 shows a configuration of the reliability evaluation device of Embodiment 1.

Next, the configuration of a reliability evaluation device 100 that evaluates the reliability of the application procedure by using the reliability evaluation method of this embodiment is explained. FIG. 4 is a functional block diagram that shows the configuration of the reliability evaluation device 100. As shown in this figure, the reliability evaluation device 100 comprises a storage unit 110 and a control unit 120.

The storage unit 110 stores various information and comprises a node information 111 and a path information 112. The node information 111 stores data about the node (object) included in the application procedure of evaluation target. The information that shows which nodes are the start point and the verification point node of the application procedure is also included in the node information 111.

Moreover, the path information 112 stores data about the paths (actions) included in the application procedure of evaluation target. The information that shows the direction of each path and the probability of normal paths is also included in the path information 112.

FIG. 5 shows one example of the node information stored in the node information 111. As shown in this figure, the node information comprises items such as a node ID, a node name, a start point flag, a verification point flag and data is registered per node.

The node ID is an identification number to identify the node. The node name is a name of the node. The start point flag is a flag that shows whether the node is the start point node or not. "1" is set when the node is the start point node, and "0" is set when the node is not the start point node. The verification point flag is a flag that shows whether the node is the verification point node or not. "1" is set when the node is the verification point node, and "0" is set when the node is not the verification point node.

FIG. 6 shows one example of the path information stored in the path information 112. As shown in this figure, the path information comprises items such as a path ID, a node A, a node B, an action name, a direction and probability of normality, and data is registered per path.

The path ID is an identification number to identify the path. The node A is an identification ID of one node connected by the path, and the node B is an identification ID of the other node connected by the path. Moreover, the action name is a name of the action executed by the path.

The direction shows the direction of the path. "1" is set when the path comprises the directionality from the node A to the node B and "2" is set when the path comprises the directionality from the node B to the node A. "3" is set when the path comprises the directionality of the interactive direction. The probability of normality is probability that the action is normally executed in the path.

In addition, the examples of the node information and the path information shown in FIG. 5 and FIG. 6 are data originated from the model of the application for building certification procedure shown in FIG. 1 as an action diagram. When the reliability of the application for building certification procedure shown in FIG. 1 is evaluated with the reliability evaluation device 100, the user registers such data in the reliability evaluation device 100 beforehand.

The control unit 120 is a control unit that totally controls the reliability evaluation device 100. The control unit 120 comprises a pattern generating unit 121, a normality determining unit 122, a probability calculating unit 123, and a reliability calculating unit 124.

The pattern generating unit 121 is a processing unit that generates normal/abnormal patterns of the path included in the application procedure of evaluation target. The pattern generating unit 121 generates all the normal/abnormal patterns that include at least one normal path.

For example, when three paths of A to C are included in the application procedure of evaluation target, the pattern generating unit 121 generates seven normal/abnormal patterns that are A=normal, B=normal, C=normal,
A=abnormal, B=normal, C=normal,
A=normal, B=abnormal, C normal,
A=normal, B=normal, C=abnormal,
A=abnormal, B=abnormal, C=normal,
A=abnormal, B=normal, C=abnormal,
A=normal, B=abnormal, C=abnormal.

The normality determining unit 122 is a processing unit that determines whether each normal/abnormal pattern generated by the pattern generating unit 121 is normal or not. Concretely, the normality determining unit 122 determines that the normal/abnormal pattern is normal when from the start point node, it is possible to trace only normal paths in the permitted direction and reach the verification point node.

The probability calculating unit 123 is a processing unit that calculates the probability of generating the normal/abnormal pattern determined as normal by the normality determining unit 122. For example, the normal/abnormal pattern that is A=normal, B=normal and C=abnormal is determined as normal and probability of normality of each path is $P_A$, $P_B$ and $P_C$, the probability calculating unit 123 calculates the probability of generating this normal/abnormal pattern by calculating $P_A \times P_B \times (1-P_C)$.

The reliability calculating unit 124 is a processing unit that totals the calculation result of the probability calculating unit 123, and calculates the probability that the application procedure of evaluation target normally functions, that is, the reliability of the application procedure of the evaluation target.

Figure 7:
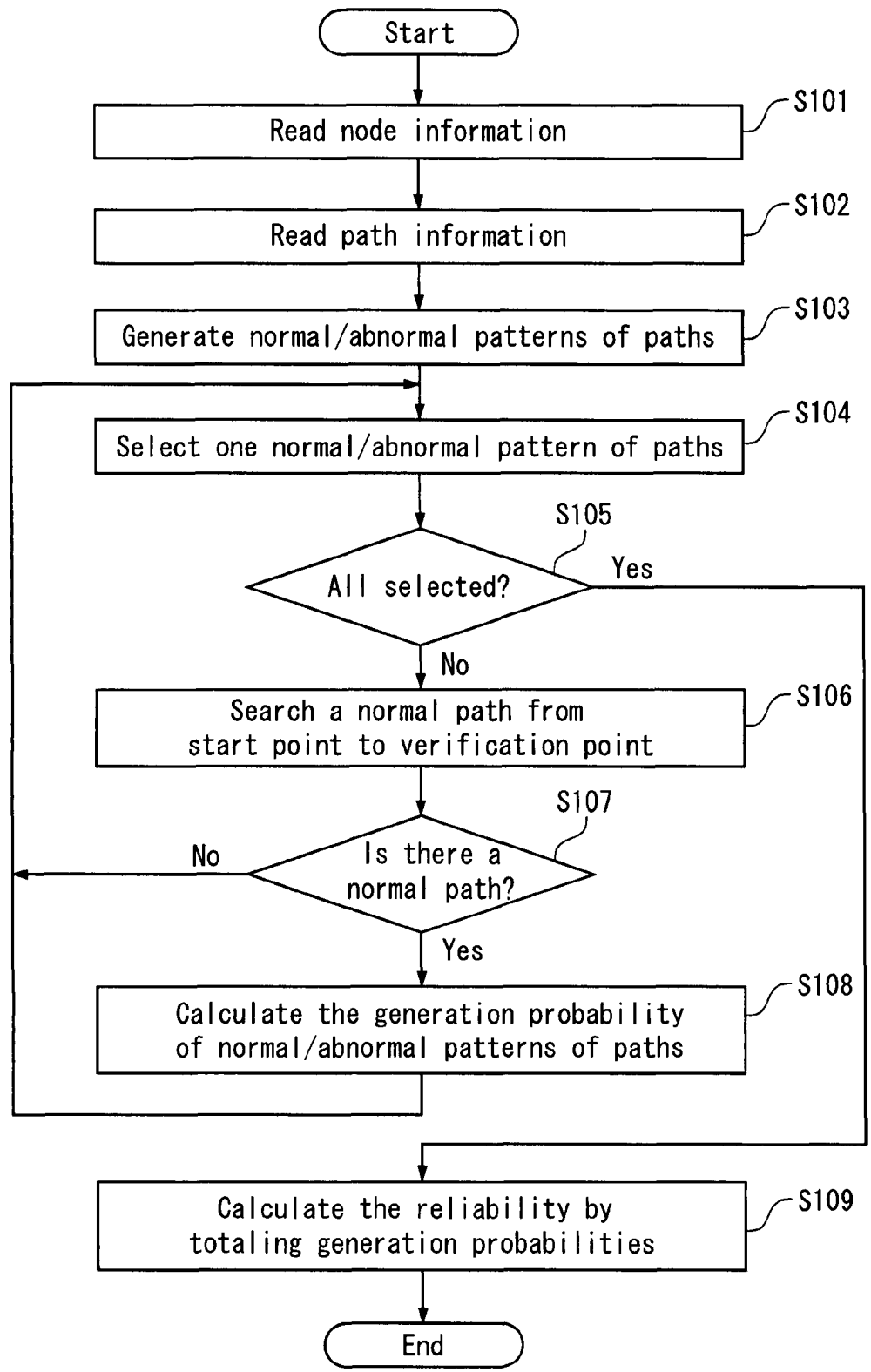
FIG. 7 is a flowchart that shows a processing procedure of the reliability evaluation device.

Next, a process performed by the reliability evaluation device 100 shown in FIG. 4 is explained. FIG. 7 is a flowchart of a process performed by the reliability evaluation device 100. As shown in this figure, the control unit 120 first reads information about the nodes included in the application procedure of evaluation target from the node information 111 stored in the storage unit 110 (Step S101), and reads information about the paths included in the application procedure of evaluation target from the path information 112 stored in the storage unit 110 (Step S102).

Subsequently, by an instruction from the control unit 120, the pattern generating unit 121 generates the normal/abnormal patterns of paths on the basis of information read at S101 and S102 (Step S103). Moreover, the unprocessed one is selected from the normal/abnormal patterns of the generated paths (Step S104). When it could be selected (Step S105NO), the normality determining unit 122 searches for a normal path that reaches from the start point node to the verification point node in the selected normal/abnormal pattern by the instruction from the control unit 120 (Step S106).

Here, when a normal path was found (Step S107YES), the probability calculating unit 123 calculates the generation probability of the normal/abnormal patterns by the instruction from the control unit 120 (Step S108). Afterwards, it returns to Step S104, and the selection of the following normal/abnormal patterns is attempted. On the other hand, when a normal path was not found (Step S107NO), it returns to Step S104, and the selection of the following normal/abnormal patterns is attempted.

In step S104, when all the normal/abnormal patterns have already been selected (Step S105YES), by the instruction from the control unit 120, the reliability calculating unit 124 totals the generation probability calculated by the probability calculating unit 123 and the reliability of the application procedure is calculated (Step S109).

Figure 8:
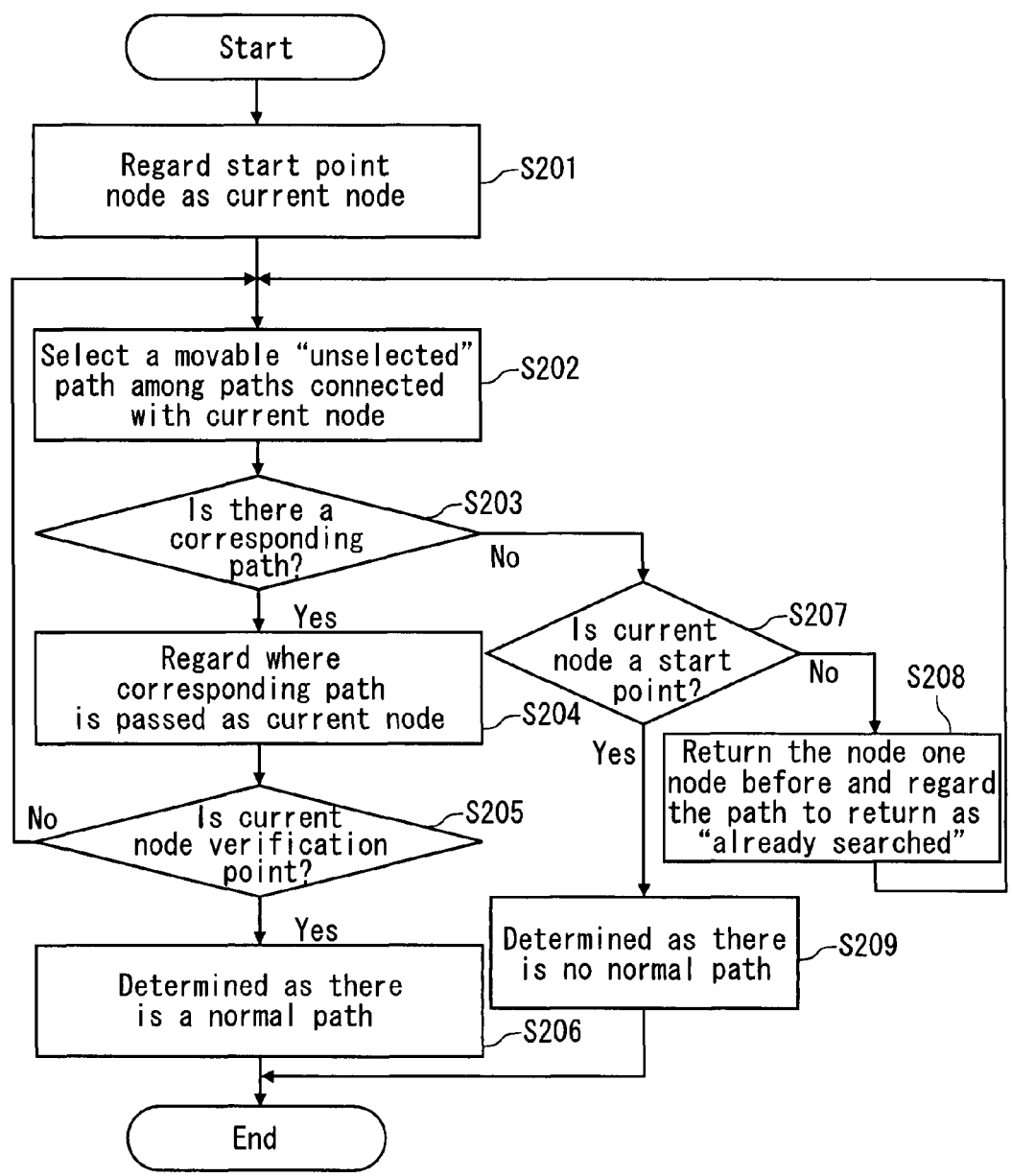
FIG. 8 is a flowchart that shows a process for searching for a normal path.

The search processing of the normal path executed by the normality determining unit 122 in Step S106 in FIG. 7 is executed by a processing procedure, for example, such as FIG. 8. First of all, the normality determining unit 122 regards the start point node as the current node (Step S201). Moreover, it can move from the path connected with the current node, and one path that is not "searched" is selected (Step S202). Here, "can move" means that doesn't contradict the directionality of the path.

Moreover, when the corresponding path could be selected (Step S203YES), the path is passed, and the reached node is regarded as the current node (Step S204). Moreover, if the current node is the verification point node (Step S205YES), it is determined as there is a normal path and search is ended (Step S206). On the other hand, if the current node is not the verification point node (Step S205NO), it returns to Step S202 and continues to search.

In addition, when the corresponding path could not be selected (Step S203NO), the following procedures are executed in Step S202. That is, if the current node is not the start point node (Step S207NO), it returns to the previous node, and the path where it returned is regarded as "searched" (Step S208), it returns to Step S202 and continues to search. On the other hand, if the current node is the start point node (Step S207YES), it is determined as no normal path and it ends to search (Step S209).

Figure 9:
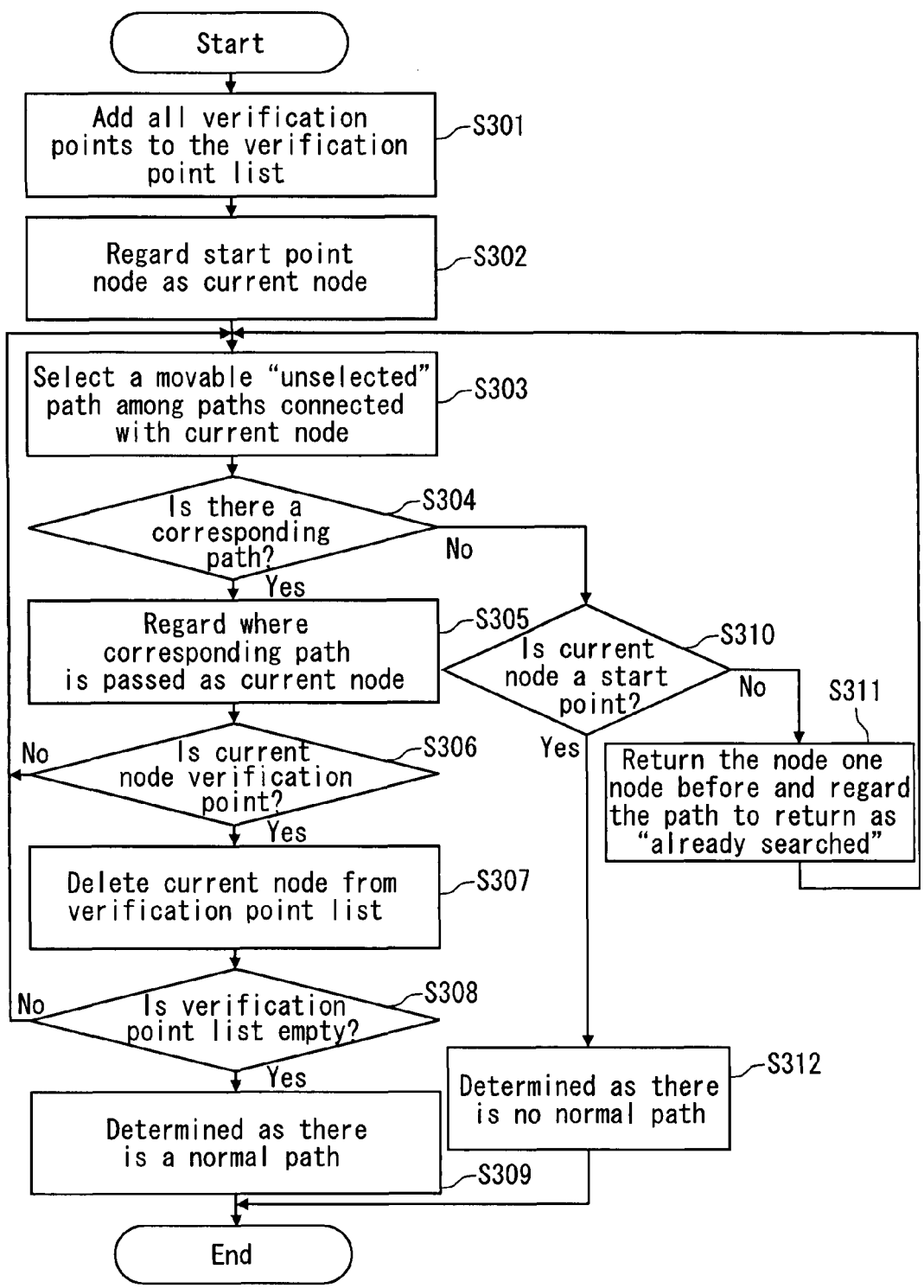
FIG. 9 is a flowchart that shows a process for searching for a normal path.

The processing procedure shown in FIG. 8 is a procedure when the application procedure as processing target comprises one start point node and one verification point node. When the application procedure as evaluation target comprises plural point nodes and verification point nodes, this procedure is repeatedly executed. In addition, when the application procedure as evaluation target comprises one start point node and plural verification point nodes, as the processing procedure shown in FIG. 9, the verification point is retained as a list and reach to all the verification points can be confirmed by one search.

In addition, the configuration of the reliability evaluation device 100 of this embodiment shown in FIG. 4 can be variously changed if it's without departing from the scope of the present invention. For example, the control unit 120 of the reliability evaluation device 100 is mounted as software and the same function as the reliability evaluation device 100 can be realized by executing this by a computer. One example of the computer that executes a reliability evaluation program 1071 which mounts the function of the control part 120 as software is shown as follows.

Figure 10:
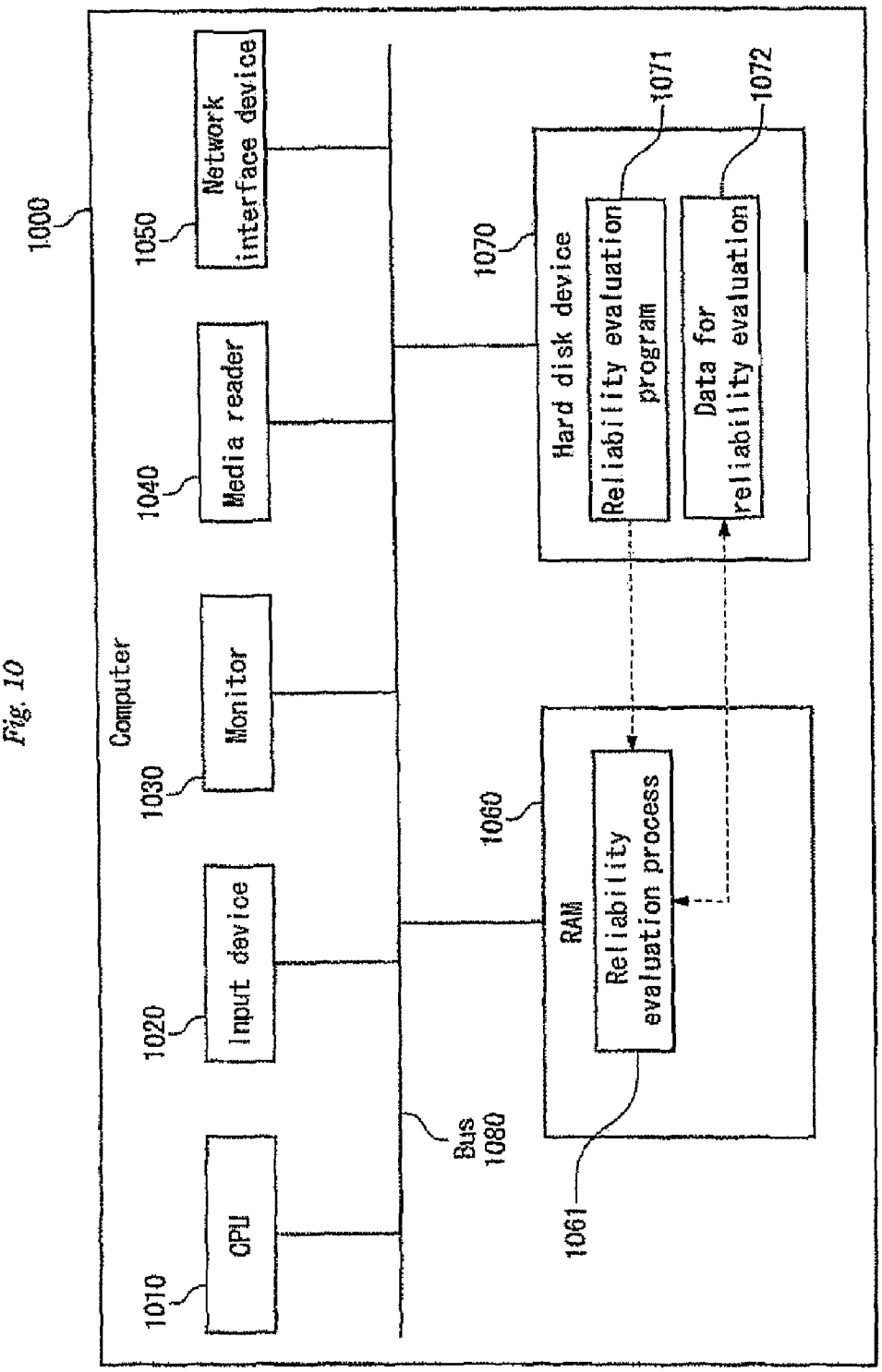
FIG. 10 is a functional block diagram that shows the hardware construction of the computer to execute the reliability evaluation program.

FIG. 10 is a functional block diagram that shows a computer 1000 which executes the reliability evaluation program 1071. This computer 1000 comprises CPU (Central Processing Unit) 1010 that executes various calculation processing, an input device 1020 that receives data input by the user, a monitor 1030 that displays various information, media reader 1040 that reads such as a program from a storage medium, a network interface device 1050 that receives/sends data between another computer via network, RAM (Random Access Memory) 1060 that temporarily stores various information and a hard disk device 1070 that are connected by bus 1080.

Moreover, in the hard disk drive 1070, the reliability evaluation program 1071 that causes the computer to execute the same function as the control part 120 shown in FIG. 4 and data for reliability evaluation 1072 corresponding to various data stored in the storage unit 110 shown in FIG. 4 are stored. In addition, it is also possible to distribute and store the data for reliability evaluation 1072 in another computer connected via network.

Moreover, the reliability evaluation program 1071 comes to function as a reliability evaluation process 1061 when the CPU 1010 reads the reliability evaluation program 1071 from the hard disk drive 1070 and develops it to the RAM 1060. Moreover, the reliability evaluation process 1061 develops such as information read from the data for reliability evaluation 1072 in the area assigned to itself on the RAM 1060, and processes various data based on such as this developed data.

In addition, the above-mentioned reliability evaluation program 1071 needs not always be stored in the hard disk drive 1070, it is also possible for the computer 1000 to read and execute this program stored in storage medium such as CD-ROM. Further, it is also possible to record this program in such as another computer (or a server) connected with the computer 1000 via such as a public line, the Internet, LAN (Local Area Network) and WAN (Wide Area Network), and for the computer 1000 to read and execute this program.

As mentioned above, in the embodiment 1, the application procedure for evaluation target is regarded as a network, and the reliability of application procedure is stochastically calculated based on the probability that the reliability evaluation device 100 can reach the verification point from the start point. As a result, the application procedure can be quantitatively evaluated from the reliability viewpoint by using such the reliability evaluation device 100.

Embodiment 2

Embodiment 1 showed an example that reliability is directly calculated from the information that shows the object and actions of the application procedure. Embodiment 2 shows an example that a calculation expression such as the above Expression 2 is generated from the information that shows the object and actions of the application procedure and reliability is calculated by applying the probability of normality of each action to this calculation expression.

Figure 11:
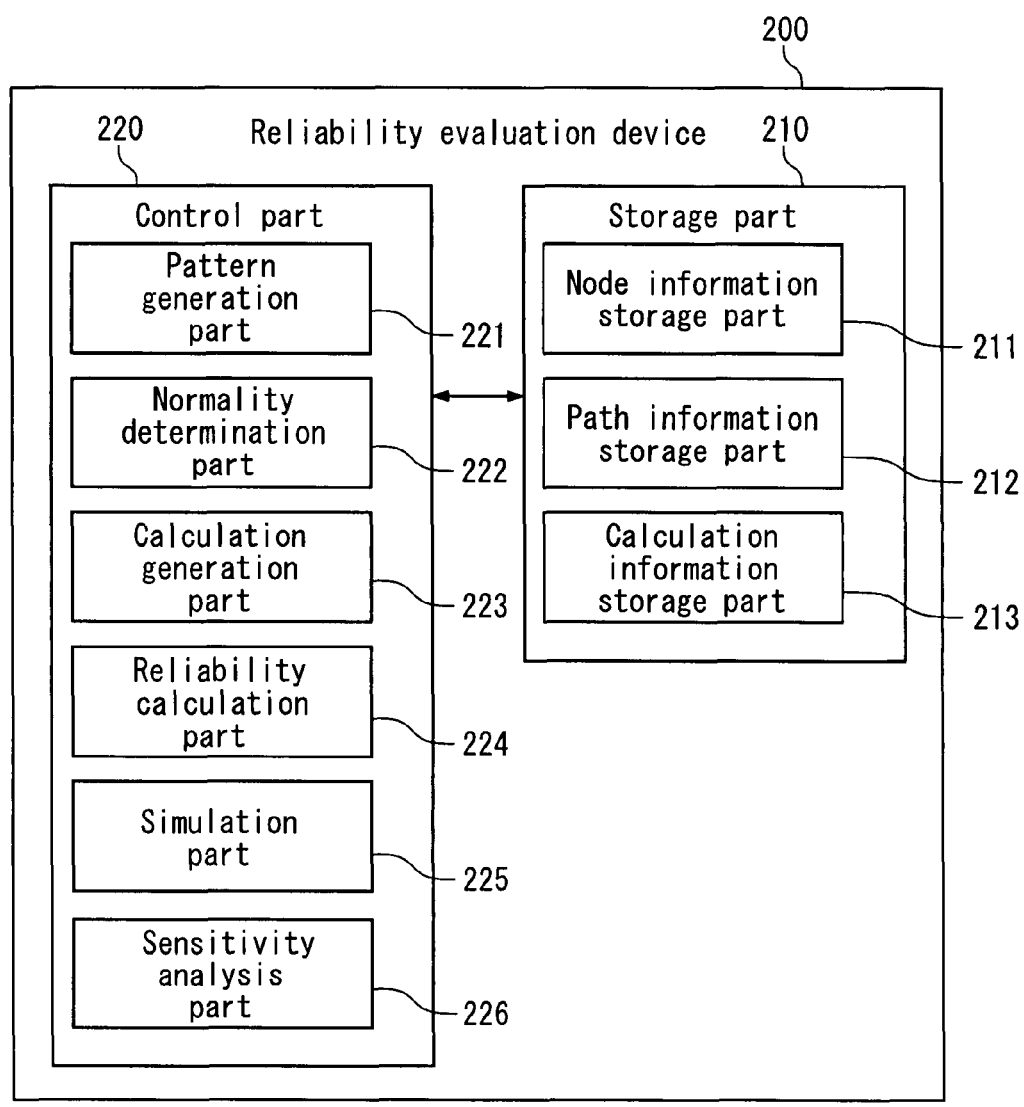
FIG. 11 shows a configuration of the reliability evaluation device of Embodiment 2.

FIG. 11 is a functional block diagram that shows the configuration of a reliability evaluation device 200 of this embodiment. As shown in this figure, the reliability evaluation device 200 comprises a storage unit 210 and a control unit 220.

The storage unit 210 is a storage unit to store various information such as a node information 211, a path information 212, and a calculation expression information 213. The node information 211 and the path information 212 are the data similar to the node information t 111 and the path information 112 shown in FIG. 4. The calculation expression information 213 is a data which corresponds to the calculation expression like Expression 2 to operate the reliability of the application procedure of evaluation target. The information to be stored as the calculation expression information 213 may be a calculation expression itself or may be something that the calculation expression is described in another format such as a function form.

The control unit 220 controls the entire reliability evaluation device 200, and comprises a pattern generating unit 221, a normality determining unit 222, a calculation expression generating unit 223, a reliability calculating unit 224, a simulating unit 225, and a sensitivity analyzing unit 226. The pattern generating unit 221 and the normality determining unit 222 are the processing units similar to the pattern generating unit 121 and the normality determining unit 122 shown in FIG. 4.

The calculation expression generating unit 223 generates the information corresponding to the calculation expression to calculate the reliability of the application procedure of evaluation target and to store it in the calculation expression information 213 in the storage unit 210. The calculation expression generating unit 223 updates the content of the calculation expression so as to add up the generation probability of the normal/abnormal patterns each time the normality determining unit 222 determines that the normal/abnormal pattern is normal. Moreover, if the procedure of evaluation target is the procedure shown in FIG. 1, after all information corresponding to Expression 2 is generated.

The reliability calculating unit 224 calculates the reliability of the application procedure of evaluation target based on the information corresponding to the calculation expression stored in the calculation expression information 213 and the probability of normality of each path stored in the path information 212.

The simulating unit 225 receives the input of the predicted value of the probability of normality for each path and the actual measurement value, and calculates the reliability of the application procedure for evaluation target based on these received parameters and the information corresponding to the calculation expression stored in the calculation expression information 213. The simulating unit 225 also comprises the function to visualize the calculation results to the graphs like FIG. 2 and FIG. 3.

The sensitivity analyzing unit 226 derives the expression (partially) differentiated in the term of the probability of normality of a prescribed action based on the information corresponding to the calculation expression stored in the calculation information 213, and performs sensitivity analysis by using the expression.

For example, if the above-mentioned Expression 2 is partially differentiated by $p_1$, the following Expression 8 can be obtained.

Expression 8

$$(1-p_2)p_5p_6(1-(1-p_4)(1-p_7))+(1-p_2p_4)p_5(1-p_6)p_7 \quad (8)$$

In this expression, sensibility to $p_1$ of Rel (G) can be found by substituting each $p_e$. Which variable is predominant about the increase and decrease of reliability can be determined by similarly performing partial differentiation to other variables also, finding the sensibility and comparing those values.

Figure 12:
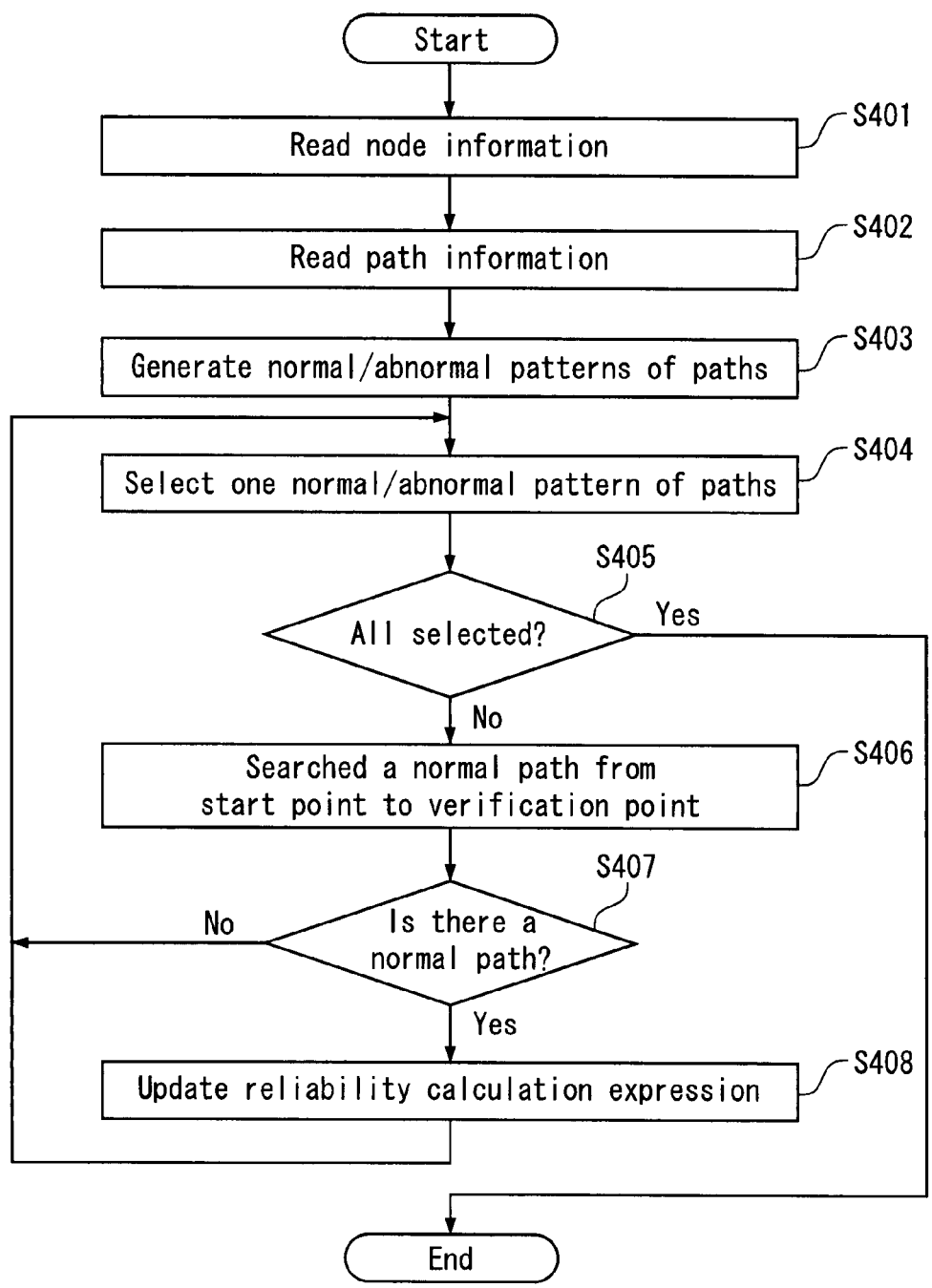
FIG. 12 is a flowchart that shows processing a procedure of the reliability evaluation device.

Next, a processing procedure of the reliability evaluation device 200 shown in FIG. 11 is explained. FIG. 12 is a flow chart that shows processing procedure until the reliability evaluation device 200 generates the calculation expression. First of all, as shown in the figure, the control unit 220 reads information about nodes included in the application procedure of evaluation target from the node information 211 (Step S401). In addition, the control unit 220 reads information about paths included in the application procedure of evaluation target from the path information 212 (Step S402).

Subsequently, the pattern generating unit 221 generates the normal/abnormal patterns of the path based on the read information by the instruction from the control unit 220 (Step S403). Moreover, one of unprocessed patterns is selected from the generated path (Step S404). When it was selected (Step S405NO), in the normal/abnormal pattern, the normality determining unit 222 searches a normal path that reaches the verification point node from the start point node by the instruction from the control unit 220 (Step S406).

Here, when a normal path is found (Step S407YES), by the instruction from the control unit 220, the calculation expression generating unit 223 reflects the generation probability of the normal/abnormal patterns to the calculation expression of reliability (Step S408). Afterwards, it returns to Step S404, and the selection of the following normal/abnormal pattern is attempted. On the other hand, when the normal path is not found (step S407NO), it returns to step S404, and it is attempted to select the next normal/abnormal pattern.

Moreover, if all the normal/abnormal patterns have been already selected in Step S404 (Step S405YES), the processing is ended.

In addition, the configuration of the reliability evaluation device 200 of this embodiment shown in FIG. 11 can be variously changed without departing from the scope of the present invention. For example, by mounting the function of the control unit 220 of the reliability evaluation device 200 as software and executing it by a computer, function equivalent to the reliability evaluation device 200 can be realized. In addition, the computer configuration that executes the reliability evaluation program that mounts the function of the control unit 220 as software is similar to the computer 1000 shown in FIG. 10.

As mentioned above, in the present embodiment 2, the reliability evaluation device 200 uses the expression to calculate the reliability of the application procedure stochastically, and can perform various simulations and sensitivity analysis. As a result, design work and improvement work to secure reliability in the application procedure can be supported by using such the reliability evaluation device 200.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

REFERENCE NUMBER LIST

100 Reliability evaluation device
110 Storage unit
111 Node information
112 Path information
120 Control unit
121 Pattern generating unit
122 Normality determining unit
123 Probability calculating unit
124 Reliability calculating unit
200 Reliability evaluation device
210 Storage unit
211 Node information
212 Path information
213 Calculation expression information
220 Control unit
221 Pattern generating unit
222 Normality determining unit
223 Calculation expression generating unit
224 Reliability calculating unit
225 Simulating unit
226 Sensitivity analyzing unit
1000 Computer
1010 CPU
1020 Input device
1030 Monitor
1040 Media reader
1050 Network interface device
1060 RAM
1061 Reliability evaluation process
1070 Hard disk drive
1071 Reliability evaluation program
1072 Data for reliability evaluation
1080 Bus

What is claimed is:

1. A computer-readable recording medium storing a program to make a computer execute a process comprising:
a pattern generating step generating normal/abnormal patterns of paths between a start point node of an application procedure and a reliability verification point node based on a node information that stores an object related to a fact confirmation at the application procedure as a node and a path information that stores processing executed between nodes as path;
a normality determining step determining whether it is possible to reach the verification point node from the start point node only via normal paths regarding each normal/abnormal pattern generated by the pattern generating step;
a calculation expression generating step generating a calculation expression to find the reliability of the application procedure as the total generation probability of the normal/abnormal patterns which were determined as reachable by the normality determining step; and
a reliability calculating step calculating the reliability of the application procedure by applying the probability of normality of the paths stored corresponding to each path in the path information; and
evaluating the reliability of the application procedure.

2. The computer-readable recording medium according to claim 1, wherein in said normality determining step, regarding each normal/abnormal pattern generated by the pattern generating step, determining whether it is possible to reach the verification point node from the start point node only via normal paths towards a direction which is stored in the path information corresponding to each path.

3. The computer-readable recording medium according to claim 1,
further comprising a simulating step simulatively calculating the reliability of the application procedure by applying a predetermined parameter to the calculation expression generated by the calculation expression generating step.

4. The computer-readable recording medium according to claim 3, wherein said simulating step outputs a graph which shows the calculation result.

5. The computer-readable recording medium according to claim 1, further comprising a sensitivity analyzing step deriving an expression partially differentiated in the term of the probability of normality of a prescribed path from the calculation expression generated by the calculation expression generating step, and analyzing sensitivity using the derived expression.

6. A computer-readable recording medium storing a program to make a computer execute a process comprising:
a pattern generating step generating normal/abnormal patterns of paths between a start point node of an application procedure and a reliability verification point node based on a node information that stores an object related to a fact confirmation at the application procedure as a node and a path information that stores processing executed between nodes as path;
a normality determining step determining whether it is possible to reach the verification point node from the start point node only via normal paths regarding each normal/abnormal pattern generated by the pattern generating step;

a probability calculating step calculating the generation probability of the normal/abnormal pattern determined as reachable by the normality determining step by using the probability of normality of paths stored corresponding to each path in the path information;

a reliability calculating step calculating the reliability of the application procedure by totaling the generation probability of the normal/abnormal patterns calculated by the probability calculating step; and evaluating the reliability of the application procedure.

7. A reliability evaluating apparatus, comprising:

a pattern generating unit generating normal/abnormal patterns of paths between a start point node of an application procedure and a reliability verification point node based on a node information that stores an object related to a fact confirmation at the application procedure as a node and a path information that stores processing executed between nodes as path;

a normality determining unit determining whether it is possible to reach the verification point node from the start point node only via normal paths regarding each normal/abnormal pattern generated by the pattern generating unit;

a calculation expression generating unit generating a calculation expression to find the reliability of the application procedure as a total of the generation probability of the normal/abnormal patterns which determined as reachable by the normality determining unit;

a reliability calculating unit calculating the reliability of the application procedure by applying the probability of normality of the paths stored corresponding to each path in the path information; and a reliability evaluation unit evaluating the reliability of the application procedure.

8. The reliability evaluating apparatus according to claim 7, wherein in said normality determining unit, regarding each normal/abnormal pattern generated by the pattern generating unit, determining whether it is possible to reach the verification point node from the start point node only via normal paths towards a direction which is stored in the path information corresponding to each path.

9. The reliability evaluation apparatus according to claim 7, further comprising a simulating unit simulatively calculating the reliability of the application procedure by applying a predetermined parameter to the calculation expression generated by the calculation expression generating unit.

10. The reliability evaluation apparatus according to claim 9, wherein said simulating unit outputs a graph which shows the calculation result.

11. The reliability evaluation apparatus according to claim 7, further comprising a sensitivity analyzing unit deriving an expression partially differentiated in the term of the probability of normality of a prescribed path from the calculation expression generated by the calculation expression generating unit, and sensitivity analyzing by using the derived expression.

12. A method comprising:

storing an object related to a fact confirmation at a node during an application procedure as node information;

storing processing executed as a path between nodes as path information;

generating a plurality of normal/abnormal patterns of paths between a start point node of the application procedure and a reliability verification point node based on the node information;

determining whether the verification point node can be reached from the start point node only via a normal path of each of the normal/abnormal patterns;

calculating a total generation probability of the normal/abnormal patterns which were determined as reachable via a normal path;

calculating the reliability of the application procedure by applying the generation probability to each path in the path information; and evaluating the reliability of the application procedure.

13. A system comprising:

means for storing an object related to a fact confirmation at a node during an application procedure as node information;

means for storing processing executed as a path between nodes as path information;

means for generating a plurality of normal/abnormal patterns of paths between a start point node of the application procedure and a reliability verification point node based on the node information;

means for determining whether the verification point node can be reached from the start point node only via a normal path of each of the normal/abnormal patterns;

means for calculating a total generation probability of the normal/abnormal patterns which were determined as reachable via a normal path;

means for calculating the reliability of the application procedure by applying the generation probability to each path in the path information; and means for evaluating the reliability of the application procedure.

14. An apparatus comprising:

an application procedure including a plurality of nodes, a plurality of paths connecting the nodes;

an object storage storing an object related to a fact confirmation at one of the plurality of nodes as node information;

a processing storage storing processing executed along one of said plurality of paths as path information;

a pattern generator generating a plurality of normal/abnormal patterns corresponding to the plurality of paths between a start point node of the plurality of nodes and a reliability verification point node of the plurality of nodes based on the node information;

a reachability determiner determining whether the verification point node can be reached from the start point node via only a normal path for each of the plurality of paths;

a probability calculator calculating a total generation probability of the plurality of normal/abnormal patterns for the verification point nodes which were determined as reachable via a normal path;

a reliability calculator calculating the reliability of the application procedure by applying the generation probability to each of the plurality of paths in the path information; and an evaluator evaluating the reliability of the application procedure.

* * * * *

UNITED STATES PATENT AND TRADEMARK OFFICE
CERTIFICATE OF CORRECTION

| | | |
|---|---|---|
| PATENT NO. | : 7,856,412 B2 | Page 1 of 1 |
| APPLICATION NO. | : 11/976463 | |
| DATED | : December 21, 2010 | |
| INVENTOR(S) | : Hironobu Kitajima et al. | |

It is certified that error appears in the above-identified patent and that said Letters Patent is hereby corrected as shown below:

Column 12, Line 27, In Claim 1, after "step;" delete "and".

Signed and Sealed this
Nineteenth Day of April, 2011

David J. Kappos
*Director of the United States Patent and Trademark Office*